US012645224B2

(12) United States Patent
Momose et al.

(10) Patent No.: US 12,645,224 B2
(45) Date of Patent: Jun. 2, 2026

(54) REMOTE DRIVING SYSTEM, REMOTE DRIVING TERMINAL, AND METHOD FOR REMOTE DRIVING

(71) Applicant: TOYOTA JIDOSHA KABUSHIKI KAISHA, Toyota (JP)

(72) Inventors: Hirofumi Momose, Toyota (JP); Junji Kawamuro, Toyota (JP); Shuichi Tamagawa, Kitanagoya (JP); Kosuke Akatsuka, Mishima (JP); Yuki Suehiro, Toyota (JP); Naofumi Kobayashi, Gotemba (JP); Rio Suda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 256 days.

(21) Appl. No.: 18/394,467

(22) Filed: Dec. 22, 2023

(65) Prior Publication Data

US 2024/0248479 A1     Jul. 25, 2024

(30) Foreign Application Priority Data

Jan. 25, 2023     (JP) ................................. 2023-009602

(51) Int. Cl.
| | |
|---|---|
| *G05D 1/225* | (2024.01) |
| *G05D 1/243* | (2024.01) |
| *G05D 1/617* | (2024.01) |
| *G05D 109/10* | (2024.01) |
| *G05D 111/10* | (2024.01) |

(52) U.S. Cl.
CPC ............. *G05D 1/225* (2024.01); *G05D 1/243* (2024.01); *G05D 1/617* (2024.01); *G05D 2109/10* (2024.01); *G05D 2111/10* (2024.01)

(58) Field of Classification Search
CPC ........ G05D 1/225; G05D 1/243; G05D 1/617; G05D 2109/10; G05D 2111/10; G05D 2107/13; G05D 1/2247; G05D 1/227; G05D 1/221; G05D 1/86; G05B 19/0423; G05B 2219/23051
See application file for complete search history.

(56) References Cited

U.S. PATENT DOCUMENTS

| | | | |
|---|---|---|---|
| 11,215,982 B2 * | 1/2022 | Urano | ................... G05D 1/0011 |
| 11,325,618 B2 | 5/2022 | Umeda | |
| 2019/0137999 A1 * | 5/2019 | Taguchi | ............ B60W 60/0018 |
| 2020/0209888 A1 | 7/2020 | Sakai et al. | |

(Continued)

FOREIGN PATENT DOCUMENTS

JP          2021-018486 A       2/2021

*Primary Examiner* — Thomas Ingram

(74) *Attorney, Agent, or Firm* — Sughrue Mion, PLLC

(57)     ABSTRACT

The present disclosure relates to a remote driving system that performs remote driving of a vehicle based on an operation amount input to a remote driving terminal. The remote driving system includes at least one processor. The at least one processor detects a first situation in which the remote driving of the vehicle is required. The at least one processor acquires an urgency level of the first situation. The at least one processor performs an initial check for checking that the remote driving can be started at the remote driving terminal when the first situation is detected. The at least one processor omits a part of the initial check according to the urgency level.

13 Claims, 13 Drawing Sheets

1: REMOTE DRIVING SYSTEM

(56)          References Cited

U.S. PATENT DOCUMENTS

2020/0326702 A1     10/2020  Iwamoto et al.
2021/0016795 A1*     1/2021  Matsushita  ........... B60W 50/12
2021/0041894 A1*     2/2021  Urano  .................. G05D 1/0223
2021/0055741 A1*     2/2021  Kawanai  ................ G08G 1/167
2021/0058173 A1*     2/2021  Otaki  .................... G05D 1/223
2021/0072743 A1*     3/2021  Otaki  .................. B60W 60/001
2021/0080943 A1*     3/2021  Iwamoto  ............ G01C 21/3407
2021/0089024 A1*     3/2021  Nordbruch  ........... G05D 1/0016

* cited by examiner 400             300

VCL

REM

X

100

200

1: REMOTE DRIVING SYSTEM

100: VEHICLE

200: REMOTE DRIVING TERMINAL

350

CONTROL DEVICE

360

PROCESSOR

370

MEMORY

PROGRAM

310

COMMUNICATION DEVICE

300: MANAGEMENT DEVICE

1

REMOTE DRIVING SYSTEM, REMOTE DRIVING TERMINAL, AND METHOD FOR REMOTE DRIVING

CROSS-REFERENCE TO RELATED APPLICATION

The present application claims priority under 35 U.S.C. § 119 to Japanese Patent Application No. 2023-009602, filed on Jan. 25, 2023, the contents of which application are incorporated herein by reference in their entirety.

BACKGROUND

Field

The present disclosure relates to a technique for performing remote driving of a vehicle.

Background Art

Patent Literature 1 discloses a vehicle control device. When a transition from one driving state to another driving state is scheduled, the vehicle control device performs notification of information relating to the transition of the driving state to an occupant and to other vehicles. The driving state includes manual driving, autonomous driving, and remote driving.

List of Related Art

Patent Literature 1: Japanese Laid-Open Patent Application No. JP-2021-018486

SUMMARY

A system for remotely driving a vehicle based on an operation amount input to a remote driving terminal by a remote operator is known. Such a system is sometimes referred to as a remote driving system. The remote driving system starts remote driving when a situation in which the vehicle requires the remote driving occurs. However, at this time, the remote driving system does not immediately start the remote driving. For starting the remote driving, the remote driving system first performs an initial check for checking that the remote driving can be started. The remote driving system starts the remote driving only after obtaining a good result of the initial check. Therefore, in order to smoothly start the remote driving, it is required to finish the initial check early.

An object of the present disclosure is to provide a technique for finishing an initial check early and starting remote driving smoothly in a remote driving system.

The first aspect of the present disclosure relates to a remote driving system that performs remote driving of a vehicle based on an operation amount input to a remote driving terminal. The remote driving system includes at least one processor. The at least one processor detects a first situation in which the remote driving of the vehicle is required. The at least one processor acquires an urgency level of the first situation. The at least one processor performs an initial check for checking that the remote driving can be started at the remote driving terminal when the first situation is detected. The at least one processor omits a part of the initial check according to the urgency level.

The second aspect of the present disclosure relates to a remote driving terminal that performs remote driving of a vehicle based on an operation amount input by a remote operator. The remote driving terminal includes at least one processor. The at least one processor acquires information indicating that a first situation in which the remote driving of the vehicle is required is detected. The at least one processor acquires an urgency level of the first situation. The at least one processor performs an initial check for checking that the remote driving terminal can start the remote driving when the first situation is detected. The at least one processor omits a part of the initial check according to the urgency level.

The third aspect of the present disclosure relates to a method for performing remote driving of a vehicle based on an operation amount input into a remote driving terminal. The method includes detecting a first situation in which the remote driving of the vehicle is required, acquiring an urgency level of the first situation, performing an initial check for checking that the remote driving can be started at the remote driving terminal when the first situation is detected, and omitting a part of the initial check according to the urgency level.

According to the present disclosure, an urgency level of a situation in which remote driving of a vehicle is required is acquired. Then, a part of an initial check is omitted according to the urgency level. By omitting a part of the initial check, it is possible to finish the initial check early and to smoothly start the remote driving. That is, according to the present disclosure, it is possible to smoothly start the remote driving with the urgency level of the situation in which the remote driving of the vehicle is required taken into consideration.

DETAILED DESCRIPTION

Embodiments of the present disclosure will be described with reference to the accompanying drawings.

1. Remote Driving System

1-1. Configuration of System

Figure 1:
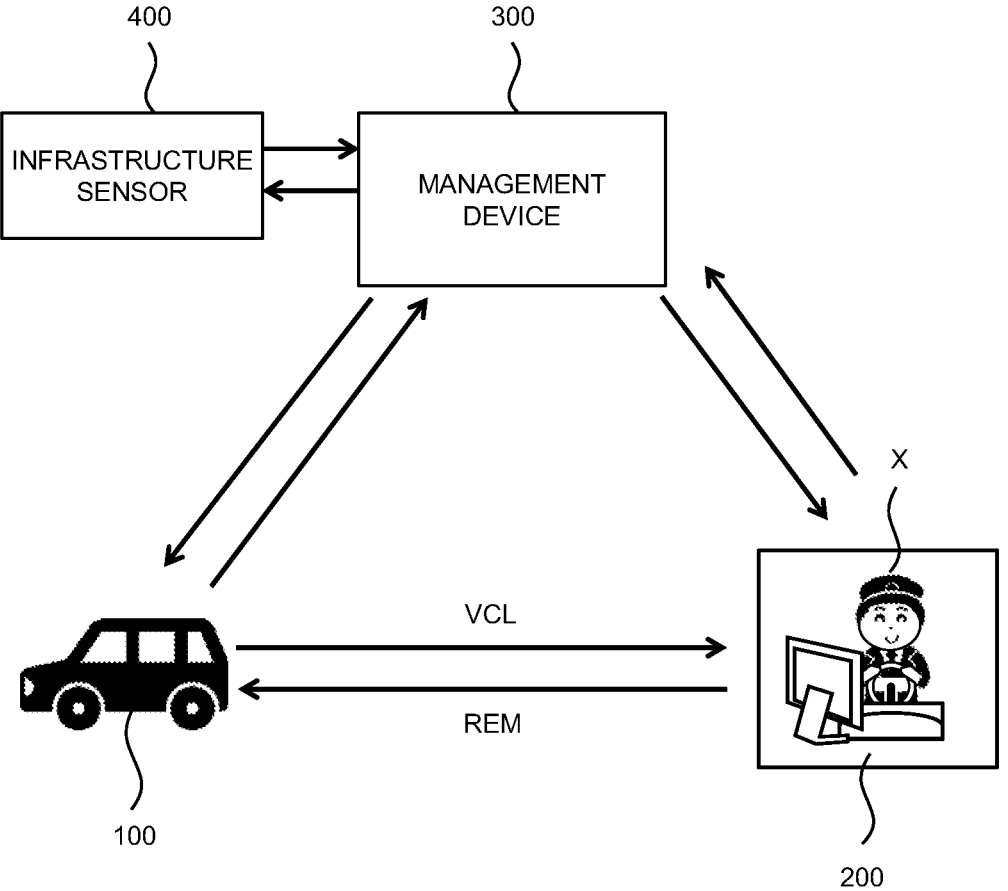
FIG. 1 is a schematic diagram illustrating a configuration example of a remote driving system according to a present embodiment.

FIG. 1 is a schematic diagram illustrating a configuration example of a remote driving system 1 according to the present embodiment. The remote driving system 1 includes a vehicle 100, a remote driving terminal 200, and a management device 300. The vehicle 100, the remote driving terminal 200, and the management device 300 can communicate with each other via a communication network.

The vehicle 100 is a vehicle to be remotely driven by a remote operator X. The vehicle 100 may be an autonomous driving vehicle. The remote driving terminal 200 is a terminal device operated by the remote operator X when the remote operator X performs remote driving of the vehicle 100. The remote driving terminal 200 may be referred to as a remote cockpit. The management device 300 manages the remote driving system 1. Typically, the management device 300 is a management server on a cloud. The management device 300 may be composed of a plurality of servers which performs distributed processes.

In addition, the remote driving system 1 may include an infrastructure sensor 400. The infrastructure sensor 400 includes an infrastructure camera. The infrastructure sensor 400 may further include a rainfall sensor or the like. The infrastructure sensor 400 is installed in an area where the vehicle 100 travels. The infrastructure sensor 400 and the management device 300 can communicate with each other via a communication network. The infrastructure sensor 400 may communicate with the vehicle 100 and the remote driving terminal 200 directly or via the management device 300.

Figure 2:
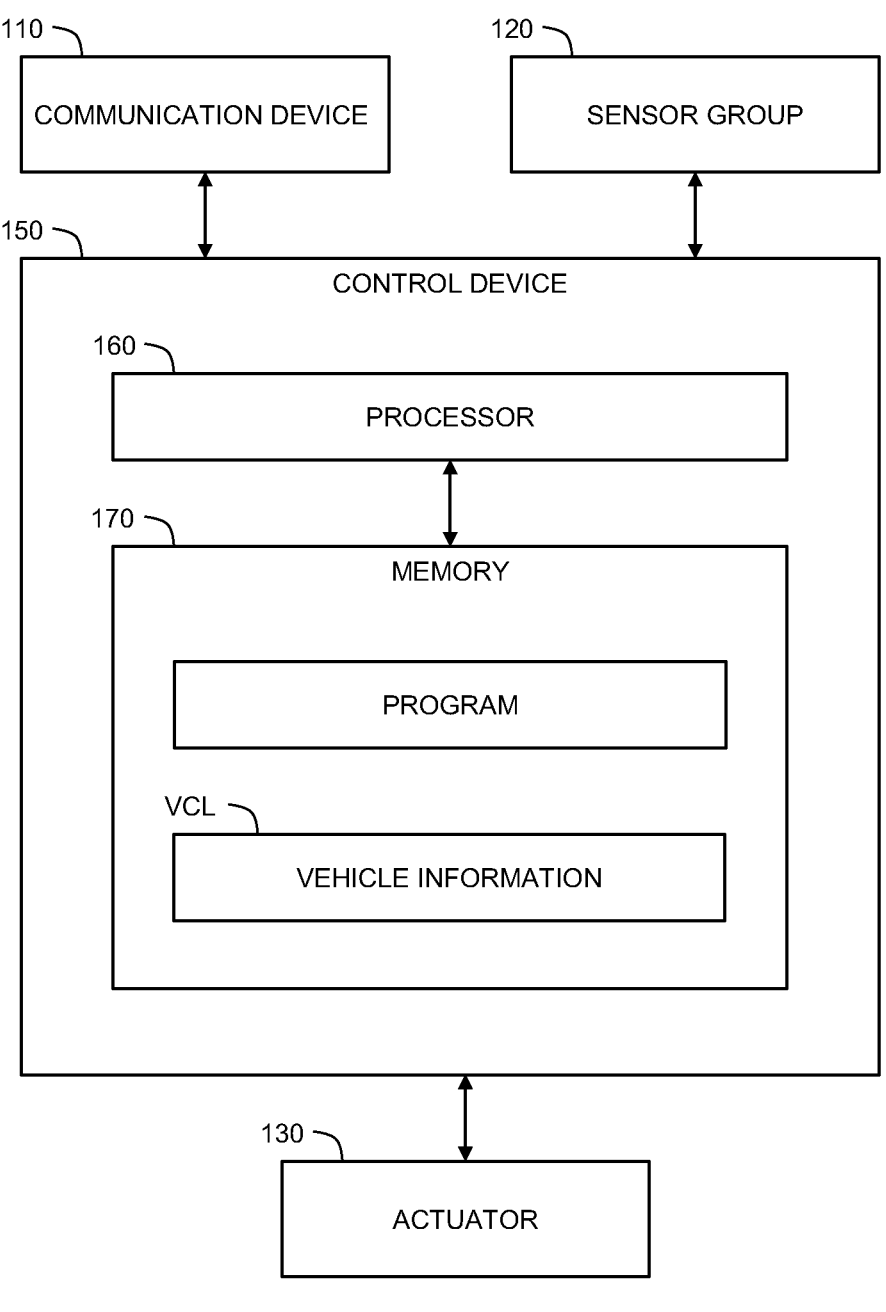
FIG. 2 is a block diagram illustrating a configuration example of a vehicle according to the present embodiment.
Figure 3:
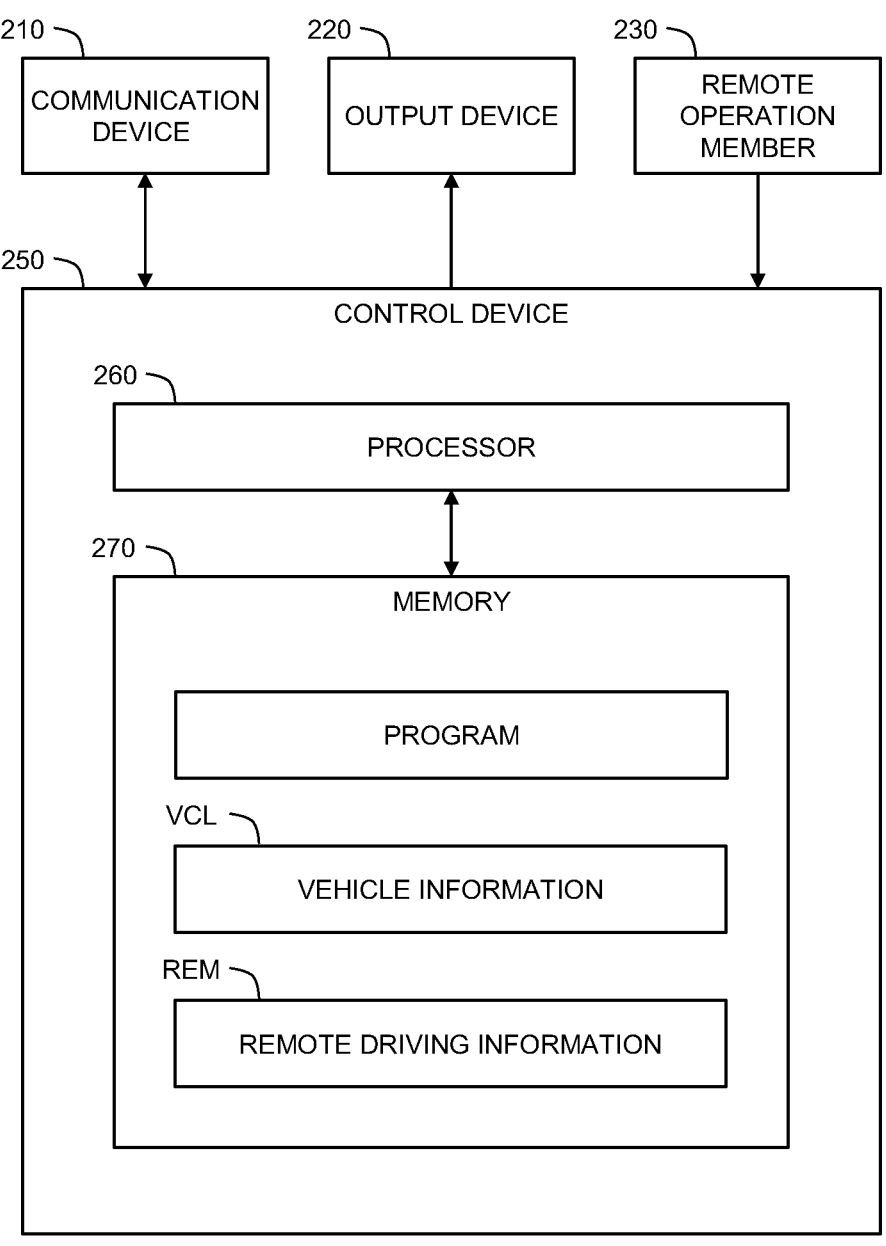
FIG. 3 is a block diagram illustrating a configuration example of a remote driving terminal according to the present embodiment.
Figure 4:
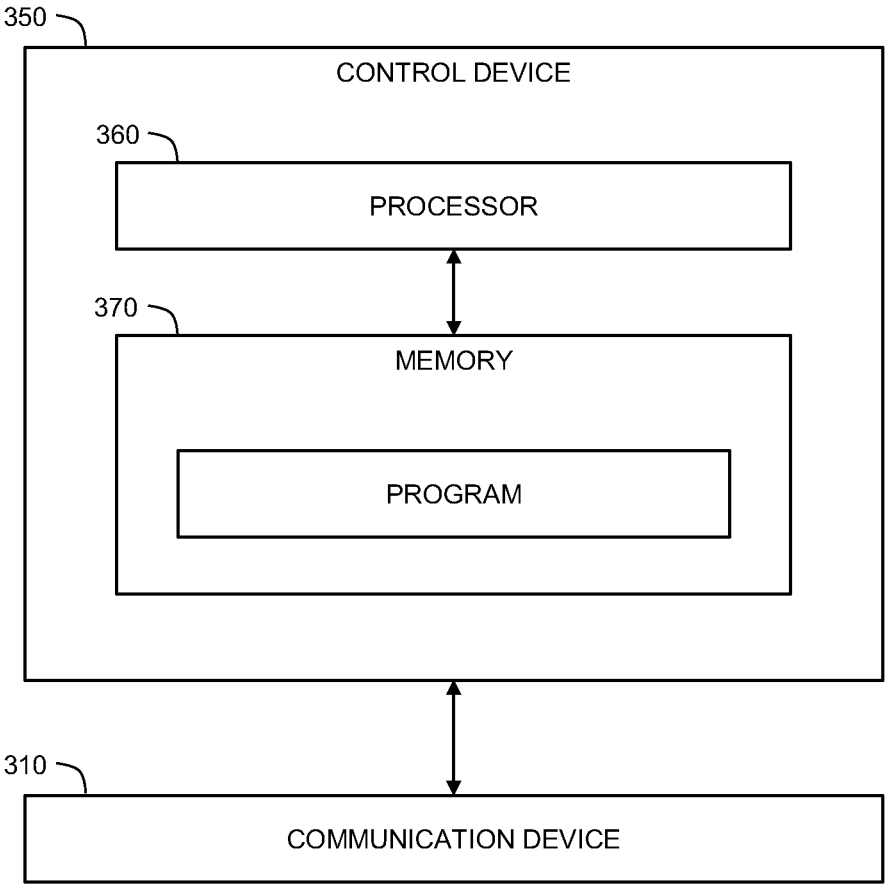
FIG. 4 is a block diagram illustrating a configuration example of a management device according to the present embodiment.

FIGS. 2 to 4 are block diagrams illustrating configuration examples of the vehicle 100, the remote driving terminal 200, and the management device 300, respectively.

FIG. 2 illustrates a configuration example of the vehicle 100. The vehicle 100 includes a communication device 110, a sensor group 120, an actuator 130, and a control device 150. In this example, the vehicle 100 is equipped with an autonomous driving system and can perform autonomous driving.

The communication device 110 communicates with the outside of the vehicle 100. The communication destination of the communication device 110 includes the remote driving terminal 200 and the management device 300.

The sensor group 120 includes a recognition sensor, a vehicle state sensor, a position sensor, and the like. The recognition sensor recognizes (detects) a situation around the vehicle 100. Examples of the recognition sensor include an in-vehicle camera, a laser imaging detection and ranging (LIDAR), and a radar. The vehicle state sensor detects a state of the vehicle 100. The vehicle state sensor includes a speed sensor, an acceleration sensor, a yaw rate sensor, a steering angle sensor, a brake hydraulic pressure sensor, and the like. The position sensor detects a position and a direction of the vehicle 100. The position sensor includes, for example, a global navigation satellite system (GNSS) sensor. The sensor group 120 may further include a rainfall sensor.

The actuator 130 includes a steering actuator, a drive actuator, and a brake actuator. The steering actuator steers the wheels. The steering actuator includes, for example, an electric power steering (EPS). The drive actuator is a power source which generates a driving force. Examples of the drive actuator include an engine, an electric motor, and an in-wheel motor. The brake actuator generates a braking force. For example, the brake actuator controls the brake hydraulic pressure to operate the brake.

The control device 150 is a computer which controls the vehicle 100. The control device 150 includes at least one processor (processing circuitry) 160 (hereinafter, simply referred to as a processor 160) and at least one memory 170 (hereinafter, simply referred to as a memory 170). The processor 160 executes various processes. For example, the processor 160 includes a central processing unit (CPU). The memory 170 stores various programs and various kinds of information necessary for processing by the processor 160. By the processor 160 executing the program stored in the memory 170, the function of the control device 150 is realized. Examples of the memory 170 include a volatile memory, a non-volatile memory, a hard disk drive (HDD), and a solid state drive (SSD). The control device 150 may include at least one electronic control unit (ECU).

The control device 150 controls the actuator 130 to control traveling of the vehicle 100. The control device 150 acquires vehicle information VCL from the sensor group 120. The vehicle information VCL includes recognition sensor information showing a result of recognition by the recognition sensor, vehicle state information acquired from the vehicle state sensor, and position information acquired from the position sensor. The recognition sensor information includes an image captured by the in-vehicle camera. The vehicle state information includes speed information, acceleration information, steering angle information, brake hydraulic pressure information, and the like. They are acquired from the speed sensor, the acceleration sensor, the steering angle sensor, the brake hydraulic pressure sensor, and the like. The vehicle information VCL may further include highly accurate position information acquired by localization. The control device 150 can acquire highly accurate position information by performing the localization using map information and the recognition sensor information stored in the memory 170. The vehicle information VCL acquired by the control device 150 can be used for the autonomous driving or the remote driving of the vehicle 100.

For example, the control device 150 controls the autonomous driving of the vehicle 100 based on the vehicle information VCL. More specifically, the control device 150 generates a travel plan of the vehicle 100 based on the vehicle information VCL. Further, the control device 150 generates a target path necessary for the vehicle 100 to travel in accordance with the travel plan based on the vehicle information VCL. The target path is a gathering of target positions of the vehicle 100. The target path may be set to extend along the center of the lane. Then, the control device 150 controls traveling of the vehicle 100 such that the vehicle 100 follows the target path.

The control device 150 can communicate via the communication device 110 and transmit the vehicle information VCL to the remote driving terminal 200 and the management device 300. At least while the remote driving of the vehicle 100 is performed, the vehicle information VCL is transmitted to the remote driving terminal 200. The vehicle information VCL transmitted to the remote driving terminal 200 is referred to by the remote operator X, and the remote driving is performed.

FIG. 3 illustrates a configuration example of the remote driving terminal 200. The remote driving terminal 200 includes a communication device 210, an output device 220, a remote operation member 230, and a control device 250.

The communication device 210 communicates with the vehicle 100 and the management device 300.

The output device 220 outputs various kinds of information and presents the information to the remote operator X. For example, the output device 220 includes a display device. The display device displays various kinds of information to the remote operator X. As another example, the output device 220 may include a speaker.

The remote operation member 230 is a member operated by the remote operator X when the remote operator X remotely drives the vehicle 100. The remote operation member 230 includes, for example, a steering operation member, an accelerator pedal, a brake pedal, a direction indicator, and the like. The steering operation member is, for example, a steering wheel. The remote operation member 230 may include a touch panel, a button, or the like. An operation amount input by the remote operator X during the remote driving of the vehicle 100 is detected by a sensor installed in the remote operation member 230.

The control device 250 controls the remote driving terminal 200. The control device 250 includes at least one processor (processing circuitry) 260 (hereinafter, simply referred to as a processor 260) and at least one memory 270 (hereinafter, simply referred to as a memory 270). The processor 260 executes various processes. For example, the processor 260 includes a CPU. The memory 270 stores various programs and various kinds of information necessary for processing by the processor 260. By the processor 260 executing the program stored in the memory 270, the function of the control device 250 is realized. Examples of the memory 270 include a volatile memory, a non-volatile memory, an HDD, and an SSD.

The control device 250 communicates with the vehicle 100 via the communication device 210. The control device 250 receives the vehicle information VCL transmitted from the vehicle 100. The control device 250 presents the vehicle information VCL to the remote operator X by displaying the vehicle information VCL including the image on the display device. The remote operator X can recognize the state of the vehicle 100, the situation around the vehicle 100, or the like based on the vehicle information VCL displayed on the display device.

In addition, the control device 250 may acquire infrastructure information detected by the infrastructure sensor 400 directly or via the management device 300. The infrastructure information acquired by the control device 250 may include, for example, an image acquired by the infrastructure camera capturing the vehicle 100 and the surroundings thereof. The acquired infrastructure information is displayed on the display device. The remote operator X may recognize the state of the vehicle 100, the situation around the vehicle 100, or the like by referring to the infrastructure information. By presenting the image captured by the infrastructure camera to the remote operator X in addition to the image captured by the in-vehicle camera, accuracy of the remote driving or usability for the remote operator X can be improved.

The control device 250 generates remote driving information REM based on the operation amount input by the remote operator X. The remote driving information REM is information for controlling the vehicle 100 by the remote driving. The remote driving information REM includes the operation amount of the remote operation member 230 input by the remote operator X. The control device 250 transmits the remote driving information REM to the vehicle 100 as necessary.

FIG. 4 illustrates a configuration example of the management device 300. The management device 300 includes a communication device 310 and a control device 350.

The communication device 310 communicates with the vehicle 100, the remote driving terminal 200, and the infrastructure sensor 400.

The control device 350 controls the management device 300. The control device 350 includes at least one processor (processing circuitry) 360 (hereinafter, simply referred to as a processor 360) and at least one memory 370 (hereinafter, simply referred to as a memory 370). The processor 360 executes various processes. For example, the processor 360 includes a CPU. The memory 370 stores various programs and various kinds of information necessary for processing by the processor 360. By the processor 360 executing the program stored in the memory 370, the function of the control device 350 is realized. Examples of the memory 370 include a volatile memory, a non-volatile memory, an HDD, and an SSD.

The control device 350 communicates with the vehicle 100 and the remote driving terminal 200 via the communication device 310. In addition, the control device 350 communicates with the infrastructure sensor 400 via the communication device 310 as necessary to acquire the infrastructure information. The infrastructure information which the control device 350 acquires from the infrastructure sensor 400 includes the image captured by the infrastructure camera.

1-2. Remote Driving by Remote Driving System

The remote driving system 1 performs the remote driving of the vehicle 100 based on the operation amount input into the remote driving terminal 200 by the remote operator X. When the remote driving system 1 detects a "first situation", the remote driving of the vehicle 100 is started. The first situation is a situation in which the remote driving of the vehicle 100 is required. The first situation may be detected by the vehicle 100 itself or may be detected by the management device 300.

The first situation may be, for example, a situation in which a remote driving request (Request for Operation, RFO) is transmitted from the vehicle 100 to the management device 300. For example, when the autonomous driving system of the vehicle 100 determines that it is difficult to continue the autonomous driving, the remote driving request is transmitted from the vehicle 100 to the management device 300. The remote driving request may be transmitted from the vehicle 100 while the vehicle 100 is traveling or may be transmitted while the vehicle 100 is stopped.

Alternatively, the remote driving system 1 may detect the first situation based on the infrastructure information acquired from the infrastructure sensor 400. For example, when the rainfall sensor of the infrastructure sensor 400 shows that average rainfall in a place where the vehicle 100 travels is larger than a threshold value, it is presumed that it is difficult for the vehicle 100 to continue the autonomous driving. As another example, when an abnormal state of the vehicle 100 is detected from the image captured by the infrastructure camera of the infrastructure sensor 400, it is presumed that the vehicle 100 has difficulty in continuing the autonomous driving. For example, the abnormal state of the vehicle 100 is a state in which the vehicle 100 is meandering. As another example, the abnormal state is a state in which the vehicle 100 is stopped although it should be traveling. The remote driving system 1 may detect the abnormal state of the vehicle 100 like these as the first situation.

Figure 5:
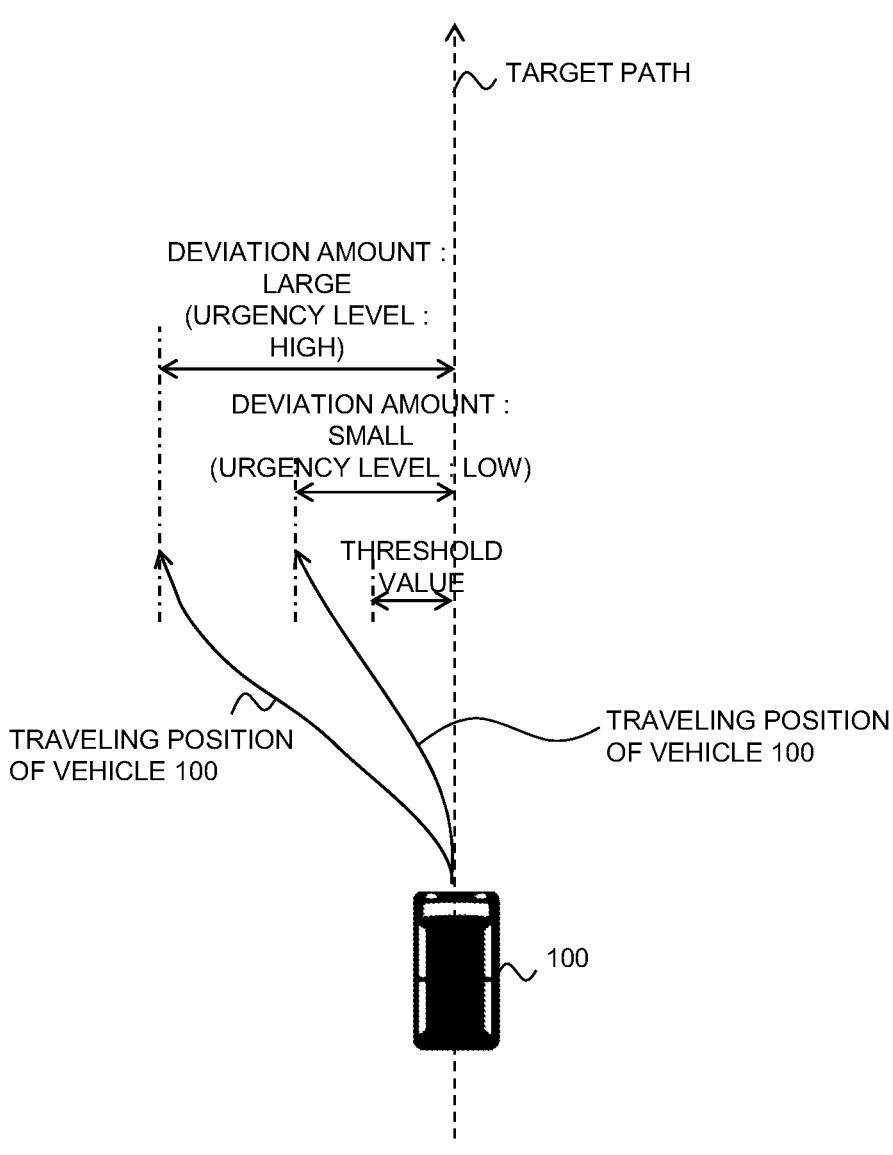
FIG. 5 is a schematic diagram for explaining deviation from a target path.

Alternatively, the remote driving system 1 may detect the first situation based on deviation of the vehicle 100 from the target path during the autonomous driving. As shown in FIG. 5, there is a situation where a traveling position of the vehicle 100 deviates from the target path and a deviation amount becomes larger than a threshold value. The remote driving system 1 may detect a situation like this as the first situation. The deviation amount can also be referred to as a distance between the vehicle 100 and the target path. The remote driving system 1 can calculate the deviation amount by comparing the position of the vehicle 100 with the target path. The remote driving system 1 may acquire the position of the vehicle 100 from the position information of the vehicle 100 acquired from the vehicle information VCL or may acquire the position of the vehicle 100 from the image captured by the infrastructure camera of the infrastructure sensor 400. Information about the target path to be followed by the vehicle 100 can be acquired from the vehicle information VCL.

When the remote driving system 1 detects the first situation, the management device 300 assigns a certain remote operator X from among a plurality of candidates to the vehicle 100. The management device 300 manages assignment relationship between the vehicle 100 and the remote operator X and provides information about the assignment relationship to the vehicle 100 and the remote driving terminal 200. The vehicle 100 and the remote driving terminal 200 which have received the information about the assignment relationship establish communication.

While the remote driving is performed, the vehicle 100 and the remote driving terminal 200 transmit and receive information via the communication network. The communication between the vehicle 100 and the remote driving terminal 200 may be performed directly or via the management device 300.

The vehicle 100 transmits the vehicle information VCL to the remote driving terminal 200. The remote driving terminal 200 receives the vehicle information VCL transmitted from the vehicle 100 and presents the vehicle information VCL to the remote operator X. For example, the remote driving terminal 200 presents the vehicle information VCL by displaying the image on the display device of the output device 220. The remote operator X recognizes the situation around the vehicle 100 by viewing the displayed information and performs the remote driving of the vehicle 100 by operating the remote operation member 230.

The control device 250 generates the remote driving information REM based on the operation amount of the remote operation member 230 input by the remote operator X. Then, the control device 250 transmits the remote driving information REM to the vehicle 100 via the communication device 210.

The vehicle 100 receives the remote driving information REM transmitted from the remote driving terminal 200. The vehicle 100 controls traveling of the vehicle in accordance with the received remote driving information REM. In this way, the remote driving of the vehicle 100 is performed.

2. Initial Check

As described above, the remote driving of the vehicle 100 is started by the remote driving system 1 when the first situation is detected. However, the remote driving is not started immediately after the first situation is detected. If the first situation is detected, the remote driving system 1 first performs an "initial check" for checking that the remote driving can be started. Then, the remote driving system 1 starts the remote driving when it is determined that the remote driving can be started in accordance with a result of the initial check.

Figure 6:
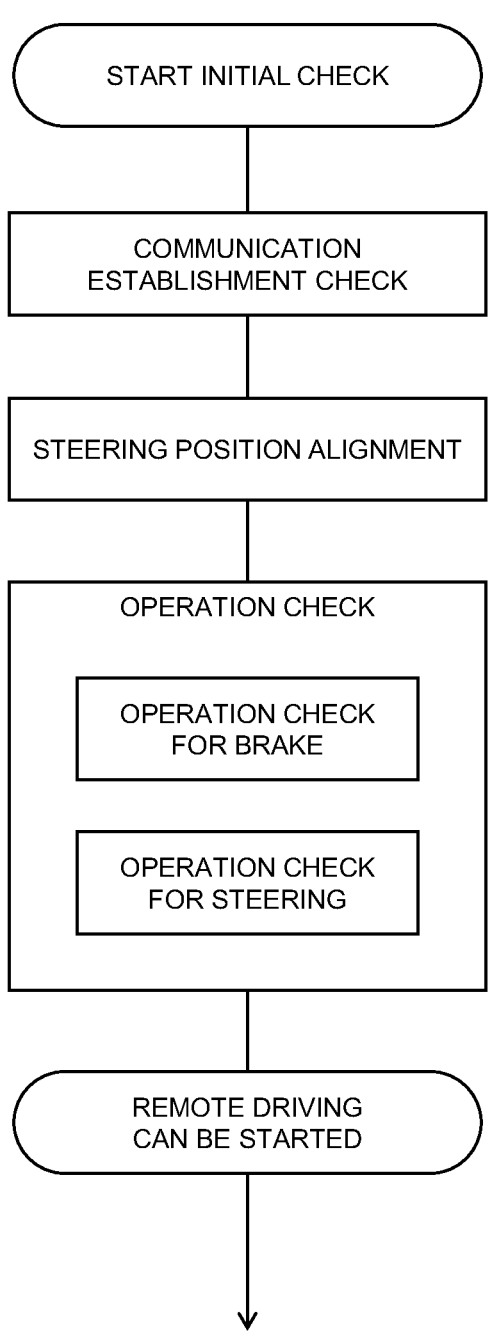
FIG. 6 is a diagram for explaining a specific example of an initial check.

FIG. 6 illustrates a specific example of the initial check. The initial check is performed at the remote driving terminal 200. As illustrated in FIG. 6, the initial check includes several steps.

In the first step of the initial check, "communication establishment check" is performed for checking that communication between the vehicle 100 and the remote driving terminal 200 is normally established. More specifically, in the communication establishment check, it is checked that the vehicle 100 and the remote driving terminal 200 assigned to this vehicle 100 are normally connected to each other and are in a communicable state. For example, the remote driving terminal 200 transmits a test signal for the communication establishment check to the vehicle 100. The test signal may be a ping. Then, when the remote driving terminal 200 normally receives a response signal transmitted from the vehicle 100 in response to the test signal, it is determined that the communication is normally established. When it is determined that the communication is normally established, it means that necessary information can be accurately transmitted and received between the vehicle 100 and the remote driving terminal 200.

By the communication establishment check being completed, it is guaranteed that the remote driving terminal 200 can normally receive the vehicle information VCL from the vehicle 100. The initial check proceeds to the next step, and "steering position alignment" is performed. The steering position alignment means bringing a steering angle of the steering operation member of the remote driving terminal 200 in line with a steering angle of the vehicle 100. The steering angle of the vehicle 100 is a steering angle of a steering wheel of the vehicle 100. Alternatively, the steering angle of the vehicle 100 may be calculated from a steering angle of the wheels of the vehicle 100. Information about the steering angle of the steering wheel or the steering angle of the wheels of the vehicle 100 can be acquired from the vehicle information VCL transmitted from the vehicle 100 to the remote driving terminal 200. The steering angle of the steering operation member of the remote driving terminal 200 is detected by the sensor installed in the steering operation member.

Figure 7:
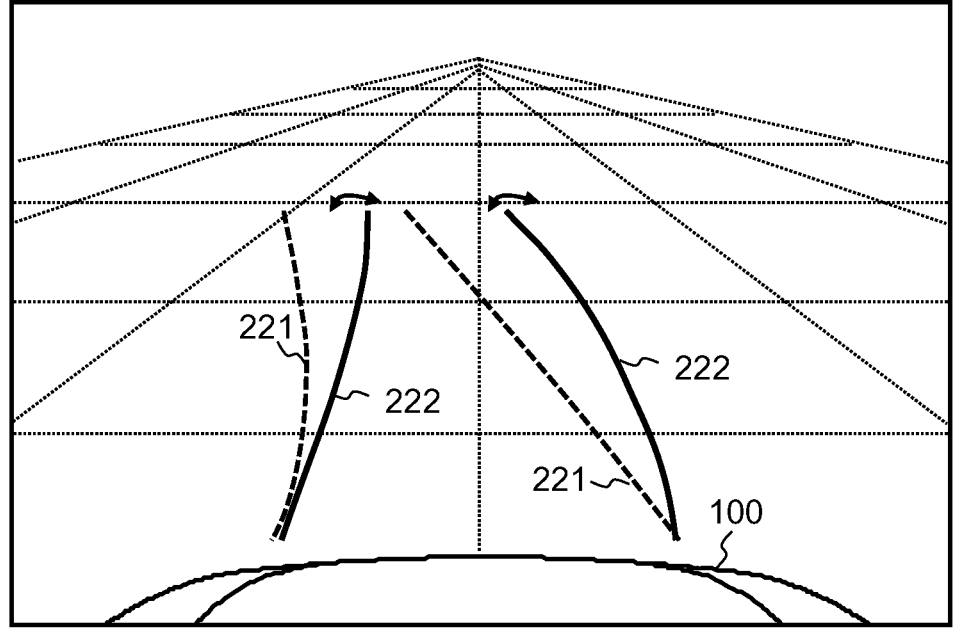
FIG. 7 is a schematic diagram illustrating steering position alignment.

FIG. 7 is a diagram illustrating an example of an image displayed on the display device of the remote driving terminal 200 when the steering position alignment is performed. A traveling trajectory 221, which is shown by dotted lines, represents a traveling trajectory of the vehicle 100 calculated from the current steering angle of the vehicle 100. On the other hand, a traveling trajectory 222, which is shown by solid lines, represents a traveling trajectory of the vehicle 100 calculated from the steering angle of the steering operation member of the remote driving terminal 200. The remote driving terminal 200 draws the traveling trajectories 221 and 222 such that they are superimposed on the image included in the vehicle information VCL. Then, the remote driving terminal 200 displays the image on which the travel trajectories 221 and 222 are superimposed on the display device. The steering position alignment means adjusting the steering angle of the steering operation member such that the two traveling trajectories 221 and 222 come into line with each other. Normally, the steering position alignment is performed by the remote operator X controlling the steering operation member such that the traveling trajectory 221 and the traveling trajectory 222 come into line with each other. Whether the two trajectories are in line with each other may be automatically determined by the remote driving terminal 200 or may be manually determined by the remote operator X. In the case where the determination is made manually, the remote operator X uses a button or the like of the remote operation member 230 to input information indicating that the two trajectories come into contact with each other.

By the steering position alignment being completed, it is ready to reflect the operation amount of the steering operation member in steering of the wheels of the vehicle 100. Thereafter, the remote driving information REM can be transmitted from the remote driving terminal 200 to the vehicle 100.

Reference is made again to FIG. 6. After the steering position alignment is completed and the steering angle of the steering operation member and the steering angle of the wheels correspond to each other, an operation check is performed. The operation check is for checking that the operation amount of the remote operator X transmitted to the vehicle 100 as the remote driving information REM is reflected in the operation of the actuator 130, that is, the actuator 130 operates in response to the operation amount of the remote operator X. The operation check includes an operation check for the brake and an operation check for the steering. Order of performing the operation check for the brake and performing the operation check for the steering is not limited.

The operation check for the brake is for checking that the operation amount of the brake input into the brake pedal of the remote operation member 230 by the remote operator X is reflected in operation of the brake actuator of the vehicle 100. The remote driving terminal 200 transmits a test signal to the vehicle 100 for requesting the brake actuator to operate. For example, the remote driving terminal 200 transmits the remote driving information REM including the operation amount of the brake pedal of the remote operation member 230 (test signal) to the vehicle 100. The brake hydraulic pressure is expected to change normally if the brake actuator operates normally in response to this test signal. Therefore, the remote driving terminal 200 receives the vehicle information VCL from the vehicle 100 and monitors information about the brake hydraulic pressure included in the vehicle information VCL. If the brake hydraulic pressure changes as expected in response to the transmission of the test signal, the remote driving terminal 200 determines that the brake actuator operates normally. If the brake actuator operates normally, the operation check for the brake is finished.

The operation check for the steering is performed for checking that the operation amount input into the steering operation member of the remote operation member 230 by the remote operator X is reflected in operation of the steering actuator and the wheels of the vehicle 100 steers. The remote driving terminal 200 transmits a test signal to the vehicle 100 for requesting the steering actuator to operate. For example, the remote driving terminal 200 transmits the remote driving information REM including the operation amount of the steering operation member of the remote operation member 230 (test signal) to the vehicle 100. The steering angle of the vehicle 100 is expected to change normally if the steering actuator operates normally in response to this test signal. Therefore, the remote driving terminal 200 receives the vehicle information VCL from the vehicle 100 and monitors the steering angle information included in the vehicle information VCL. If the steering angle of the vehicle 100 changes as expected in response to the transmission of the test signal, the remote driving terminal 200 determines that the steering actuator operates normally. If the steering actuator operates normally, the operation check for the steering is finished.

The specific example of the initial check is described above. When detecting the first situation, the remote driving system 1 first performs the initial check exemplified in FIG. 6. Then, after it is checked that the remote driving can be started as a result of the initial check, the remote driving system 1 starts the remote driving. In other words, the remote driving system 1 cannot start the remote driving until the initial check is finished. If the initial check takes a long time, the time when the remote driving is started becomes late accordingly.

However, there is a possibility that the remote driving of the vehicle 100 is required to start early in a case where the first situation is an urgent situation. For example, in a case where the vehicle 100 stops in a dangerous area, it is required to start the remote driving early. In order to start the remote driving early, it is necessary to finish the initial check early.

Therefore, when detecting the first situation, in which the remote driving of the vehicle 100 is required, the remote driving system 1 acquires an "urgency level," which is an index indicating a degree of urgency of the first situation. Then, the remote driving system 1 omits a part of the initial check according to the urgency level. By omitting a part of the initial check, the time necessary for the initial check can be shortened, and the remote driving can be started early. That is, it is possible to smoothly start the remote driving in consideration of the urgency level of the situation in which the remote driving of the vehicle 100 is required.

3. Omission of Initial Check

Omitting a part of the initial check means omitting any one or more steps from among the plurality of steps included in the initial check. Which process is omitted is determined based on the urgency level and "priority".

Figure 8:
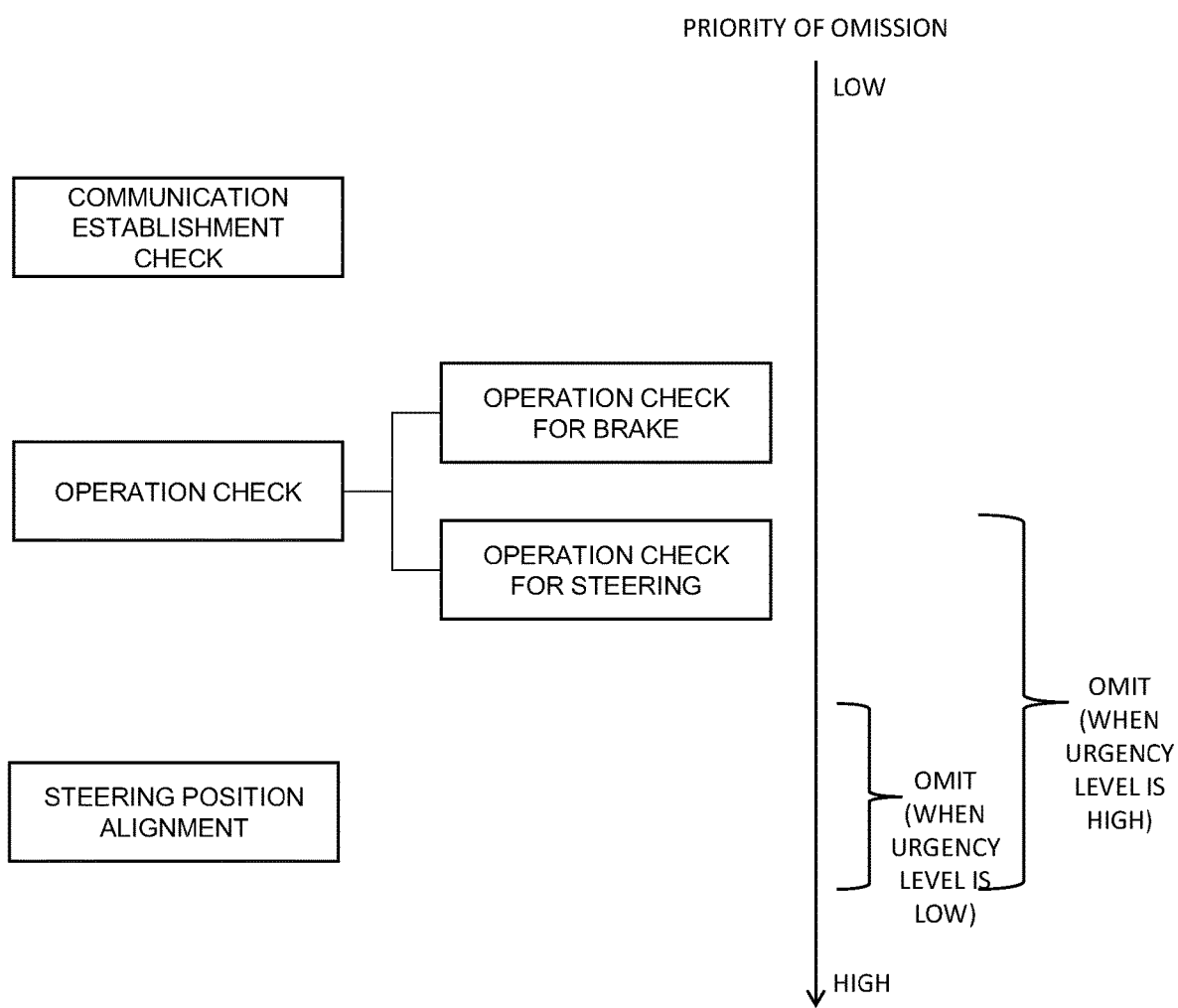
FIG. 8 is a diagram illustrating a priority map according to the present embodiment.

First, the priority is described. The priority of omission is set for each process included in the initial check in accordance with content of each process. FIG. 8 is a priority map showing the priority of omission. The priority map is stored in any of the memory 170 of the vehicle 100, the memory 270 of the remote driving terminal 200, and the memory 370 of the management device 300. When the initial check is omitted, a process having high priority is preferentially omitted in accordance with a priority map like this.

As shown in the priority map of FIG. 8, the priority of omission of the operation check is higher than that of the communication establishment check, and the priority of omission of the steering position alignment is higher than that of the operation check.

The communication establishment check is a process that is most important to be performed in advance when the remote driving of the vehicle 100 is started. If the communication between the vehicle 100 and the remote driving terminal 200 is not normally established, the vehicle information VCL and the remote driving information REM cannot be transmitted and received between the vehicle 100 and the remote driving terminal 200. If the vehicle information VCL is not normally transmitted from the vehicle 100 to the remote driving terminal 200, the remote operator X cannot obtain information necessary for the remote driving. Further, if the remote driving information REM is not normally transmitted from the remote driving terminal 200 to the vehicle 100, the remote driving cannot be performed in the first place. Therefore, the priority of omission of the communication establishment check is set to be the lowest.

Conversely, the steering position alignment is not necessarily required to be performed before the remote driving is started. In a case where the steering position alignment is performed as the initial check, the remote operator X can start to operate the steering operation member with the steering angle of the steering operation member being in line with the steering angle of the wheels, and thus can easily get the feel of the steering. However, even if the steering angle of the steering operation member is not in line with the steering angle of the wheels, the remote operator X can operate the steering operation member to input the operation amount. Therefore, the priority of omission of the steering position alignment is set to be the highest.

In addition, among the operation check, the priority of omission of the operation check for the steering is set to be higher than the priority omission of the operation check for the brake. Between the brake and the steering, the operation check for the brake is more important to be performed in advance than that for the steering. This is because, it is considered that if a situation in which the vehicle 100 needs to avoid danger urgently, the remote operator X operates the brake first. Therefore, the priority of omission of the operation check for the steering is set to be higher than that for the brake.

Next, the urgency level will be described. When a part of the initial check is omitted, an amount of omission of the initial check is determined based on the urgency level. The remote driving is required to be started earlier as the urgency level becomes higher. Therefore, the amount of omission of the initial check is made larger as the urgency level becomes higher, and the amount of omission of the initial check is made smaller as the urgency level becomes lower.

The following are examples of a method for calculating the urgency level. For example, in a case where a situation in which the position of the vehicle 100 deviates from the target path is detected as the first situation as shown in FIG. 5, the urgency level may be calculated based on the deviation amount of the position of the vehicle 100 from the target path. In this case, the urgency level is calculated to be higher as the deviation amount becomes larger.

Alternatively, the urgency level may be calculated based on a situation that the vehicle 100 is in at the time of detection of the first situation. For example, the urgency level may be calculated as follows. When the vehicle 100 is in a dangerous situation, the urgency level is calculated to be the highest. When the vehicle is not in the dangerous situation but in a situation where the vehicle may interfere with other traffic participants, the urgency level is calculated to be the next highest. In the other cases, the urgency level is calculated to be still lower. The dangerous situation is, for example, a situation in which it is raining heavily and the vehicle 100 is passing an underpass or is stopped in an underpass. As other examples, the dangerous situation is a situation where an accident such as a fire occurs at a place where the vehicle 100 is located or in the vicinity thereof or a situation where the vehicle 100 is in a railroad crossing and alarm sound is ringing. Examples of a situation where the vehicle may interfere with other traffic participants includes a situation where an emergency vehicle is approaching the vehicle 100.

The remote driving system 1 can determine a situation like these based on information acquired from the infrastructure sensor 400 or the sensor group 120. For example, the remote driving system 1 can detect a situation where it rains heavily based on information acquired from the rainfall sensor of the sensor group 120 or the rainfall sensor of the infrastructure sensor 400. As another example, the remote driving system 1 can determine that the vehicle 100 is passing or stopping in the underpass or the situation around the vehicle 100 including whether the emergency vehicle is approaching based on information acquired from the in-vehicle camera or the infrastructure camera.

As another example of the method for calculating the urgency level, in a case where the vehicle 100 is stopped or is expected to stop when the first situation is detected, the urgency level may be calculated based on a stop position of the vehicle 100. For example, the urgency level may be calculated as follows. When the stop position of the vehicle 100 is in the dangerous area, the urgency level is calculated to be the highest. When the stop position of the vehicle 100 is not in the dangerous area but in an area where the vehicle 100 may interfere with other traffic participants, the urgency level is calculated to be the next highest. In the other cases, the urgency level is calculated to be still lower.

The dangerous area mentioned here is a place where the vehicle 100 may be in danger if the vehicle 100 continues to stop in the area. Examples of the dangerous area include an area on a track of a streetcar, an area in the railroad crossing, and a stopping prohibited area. Examples of the stopping prohibited area include an area in front of a fire station. Examples of the area where the vehicle 100 may interfere with other traffic participants include the vicinity of an intersection and a road with a heavy traffic.

The remote driving system 1 can determine the stop position of the vehicle 100 based on information detected by the infrastructure sensor 400 or the sensor group 120. For example, the remote driving system 1 can determine that the vehicle 100 is stopped in the railroad crossing by acquiring the image captured by the in-vehicle camera or the infrastructure camera. Alternatively, the stop position of the vehicle 100 may be acquired by comparing the map information indicating a location of the railroad, the railroad crossing, or the like and the position information acquired from the GNSS sensor of the sensor group 120. The map information is stored in any of the memory 170 of the vehicle 100, the memory 270 of the remote driving terminal 200, and the memory 370 of the management device 300. The remote driving system 1 may determine whether the traffic is heavy at the stop position of the vehicle 100 based on road traffic information which the management device 300 has, road traffic information acquired from an external server, or the like.

4. Example of Processing

Processing executed by the remote driving system 1 will be described with reference to FIGS. 9 and 10.

Figure 9:
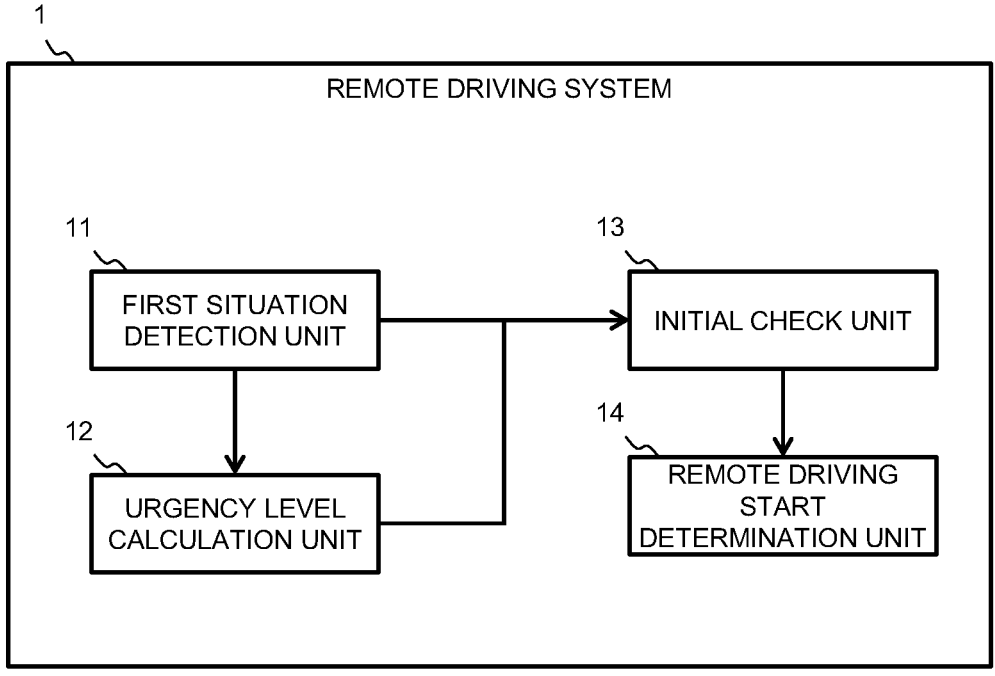
FIG. 9 is a block diagram illustrating an example of a functional configuration of the remote driving system according to the present embodiment.
Figure 10:
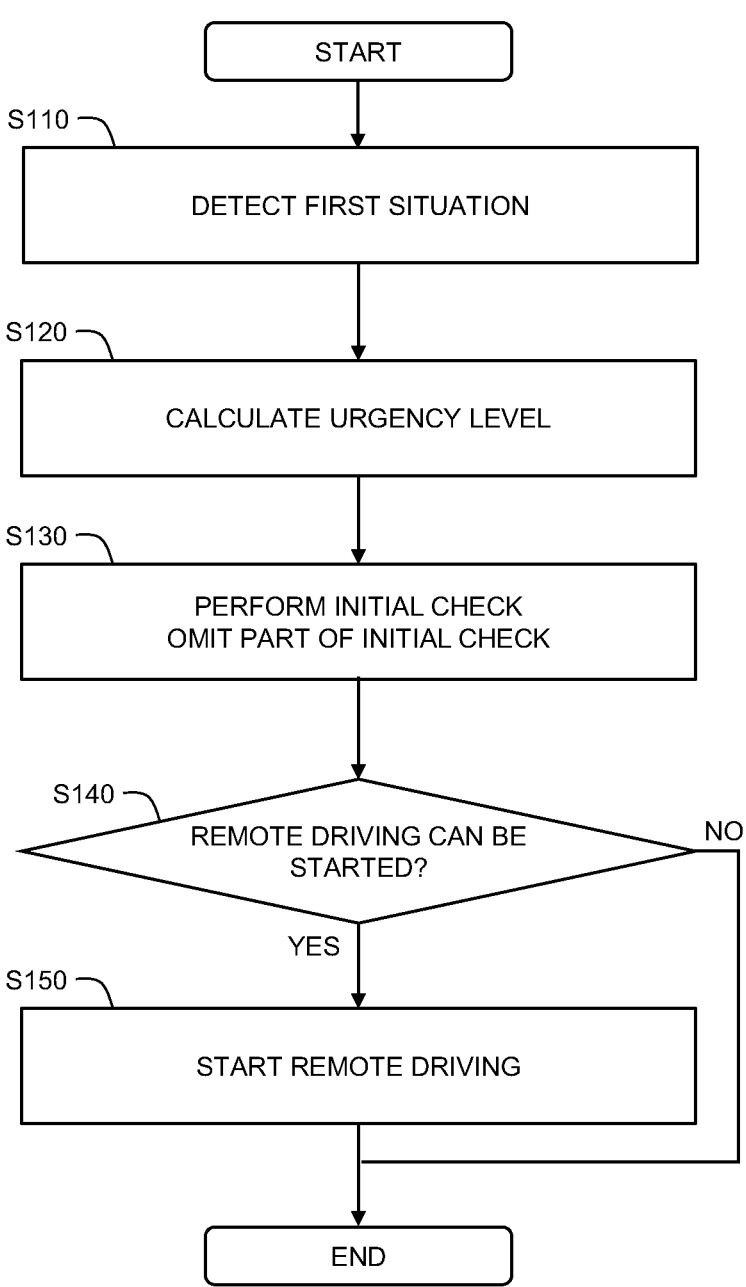
FIG. 10 is a flowchart illustrating an example of processing executed by the remote driving system according to the present embodiment.

FIG. 9 is a block diagram illustrating an example of a functional configuration of the remote driving system 1. FIG. 10 is a flowchart illustrating an example of processing executed by the remote driving system 1. The remote driving system 1 includes a first situation detection unit 11, an urgency level calculation unit 12, an initial check unit 13, and a remote driving start determination unit 14 as functional blocks.

In Step S110, the first situation detection unit 11 detects the first situation. The first situation is a situation in which the remote driving of the vehicle 100 is required. A processing entity which realizes the first situation detection unit 11 may be the processor 160 of the vehicle 100 or the processor 360 of the management device 300. For example, the processor 160 of the vehicle 100 may detect the first situation based on the information acquired from the sensor group 120. Alternatively, the processor 360 of the management device 300 may detect the first situation based on the information acquired from the infrastructure sensor 400. The first situation detection unit 11 transmits information indicating that the first situation is detected to the urgency level calculation unit 12, and then the processing proceeds to Step S120.

In Step S120, the urgency level calculation unit 12 calculates the urgency level. A processing entity which realizes the urgency level calculation unit 12 may be the processor 160, the processor 260, or the processor 360. Alternatively, the urgency level calculation unit 12 may be realized by cooperation of these processors.

For example, the processor 160 of the vehicle 100 acquires information about the stop position of the vehicle 100 from the GNSS sensor of the sensor group 120. The processor 160 also acquires information indicating a location of the dangerous area from the map information stored in the memory 170. Then, the processor 160 calculates the urgency level based on whether the stop position of vehicle 100 is included in the dangerous area or not. As another example, the processor 360 of the management device 300 may detect the traveling position of the vehicle 100 based on the infrastructure information acquired from the infrastructure sensor 400. Then, the processor 160 or the processor 360 may calculate the urgency level by comparing the traveling position of the vehicle 100 with the target path. The urgency level calculation unit 12 transmits information about the calculated urgency level to the initial check unit 13, and then the processing proceeds to Step S130.

In Step S130, the initial check unit 13 performs the initial check. The initial check unit 13 is realized by the processor 260 of the remote driving terminal 200. When performing the initial check, the initial check unit 13 omits a part of the initial check in accordance with the urgency level calculated by the urgency level calculation unit 12. Which step (steps) of the initial check is omitted is determined in accordance with to the urgency level and the priority as described above. When the initial check is finished, the initial check unit 13 transmits the result of the initial check to the remote driving start determination unit 14, and then the processing proceeds to Step S140.

In Step S140, the remote driving start determination unit 14 determines whether the remote driving can be started or not. A processing entity which realizes the remote driving start determination unit 14 may be the processor 160, the processor 260, or the processor 360. Alternatively, the remote driving start determination unit 14 may be realized by cooperation of these processors. The remote driving start determination unit 14 determines whether the remote driving can be started or not according to the result of the initial check received from the initial check unit 13. If the result of the initial check indicates that the remote driving cannot be started (Step S140; No), the processing ends.

On the other hand, if the result of the initial check indicates that the remote driving can be started (Step S140; Yes), the processing proceeds to Step S150. In Step S150, the remote driving start determination unit 14 starts the remote driving of the vehicle 100.

5. Effect

Figure 11:
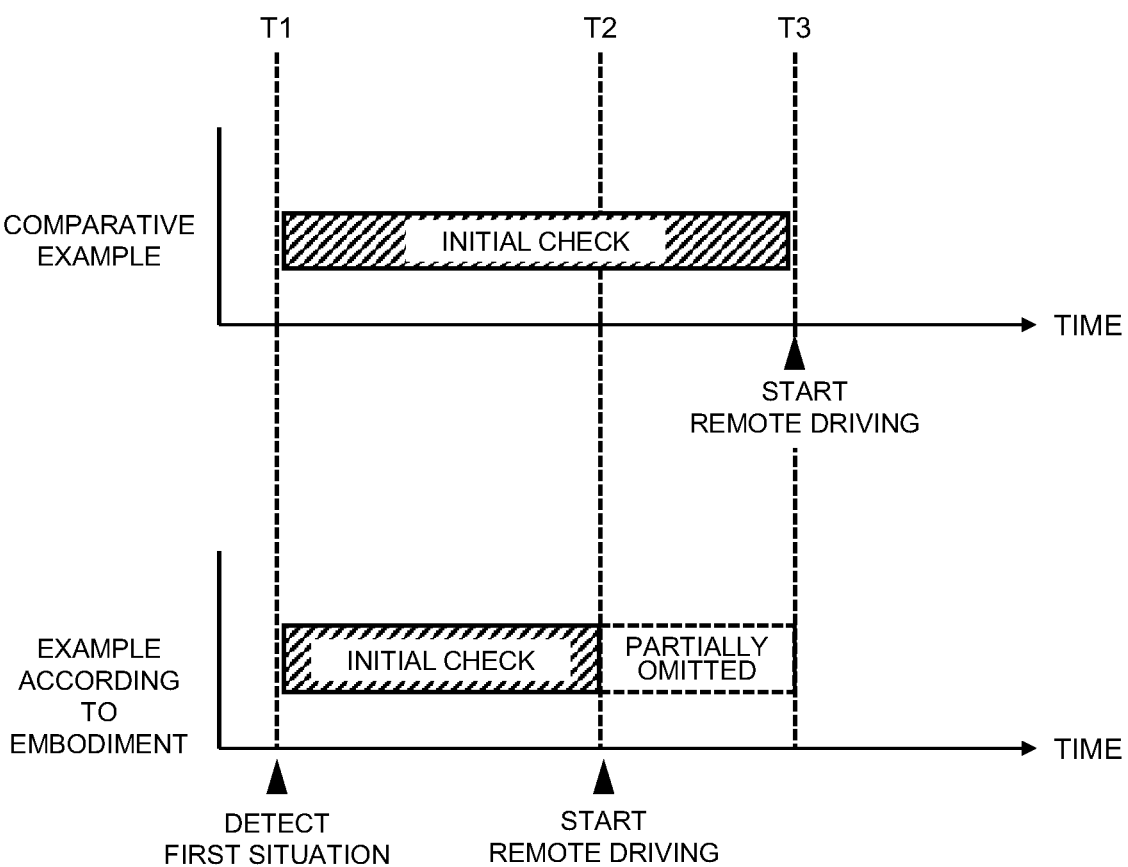
FIG. 11 is a time chart for explaining an effect of the processing executed by the remote driving system according to the present embodiment.

FIG. 11 is a time chart illustrating an effect of omitting a part of the initial check of the remote driving system 1. An upper chart shows a case in a comparative example, and a lower chart shows a case in an example according to the embodiment realized by the remote driving system 1. At time T1, the first situation is detected. It is the same in both the comparative example and the example according to the embodiment that the initial check is started in response to the detection of the first situation.

In the comparative example, the remote driving is started at time T3 after the initial check is finished. On the other hand, in the example according to the embodiment, since a part of the initial check is omitted, the time required for the initial check is shortened. Therefore, the remote driving is started at time T2, which is the time earlier than time T3.

As described above, according to the remote driving system 1 of the present embodiment, a part of the initial check is omitted in accordance with the urgency level, and thus the initial check can be finished early. In this way, the time from when the remote driving is required to when the remote driving is started can be shortened. Further, when the urgency level is particularly high, the time until the remote driving is started can be further shortened by increasing the amount of omission. In addition, which step of the initial check is omitted is determined according to the priority. Since the priority of a particularly important process is set to be low, this process is performed without being omitted, and it is possible to prevent a failure from being found after the remote driving is started. In this way, the remote driving can be started smoothly.

6. Example of Application

As an example of a scene to which the remote driving system 1 according to the present embodiment is applied, a scene of "autonomous transportation in a factory" is considered.

In the autonomous transportation in the factory, the autonomous driving vehicle autonomously travels in a factory ground. For example, the autonomous driving vehicle assembled in an assembly factory travels from the assembly factory to a yard by autonomously traveling along a predetermined route. One or more infrastructure cameras are installed on a road from the assembly factory to the yard. By using the infrastructure camera, the management device 300 of the remote driving system 1 can remotely monitor the autonomous driving vehicle that is autonomously traveling.

When a situation in which the automatic driving of the autonomous driving vehicle becomes difficult for some reason and the vehicle deviates from the target route is detected, the initial check is performed to start the remote driving. In a case where a route on which the autonomous driving vehicle travels is determined in advance as in the case of the autonomous transportation in the factory, the management device 300 can detect such a situation based on the information about the route stored in the memory 370 and the image captured by the infrastructure camera. When the initial check is performed, a part of the initial check is omitted according to the deviation amount from the target route. By omitting a part of the initial check, the remote driving can be quickly started. When the situation in which it is difficult that the autonomous driving vehicle continue to autonomously travel occurs, it is also considered to send a staff to the site and start to drive the vehicle by manual driving, but it takes time and labor. Dealing with the situation by the remote driving is more convenient and reduces time and labor.

7. Modification

7-1. First Modification

Figure 12:
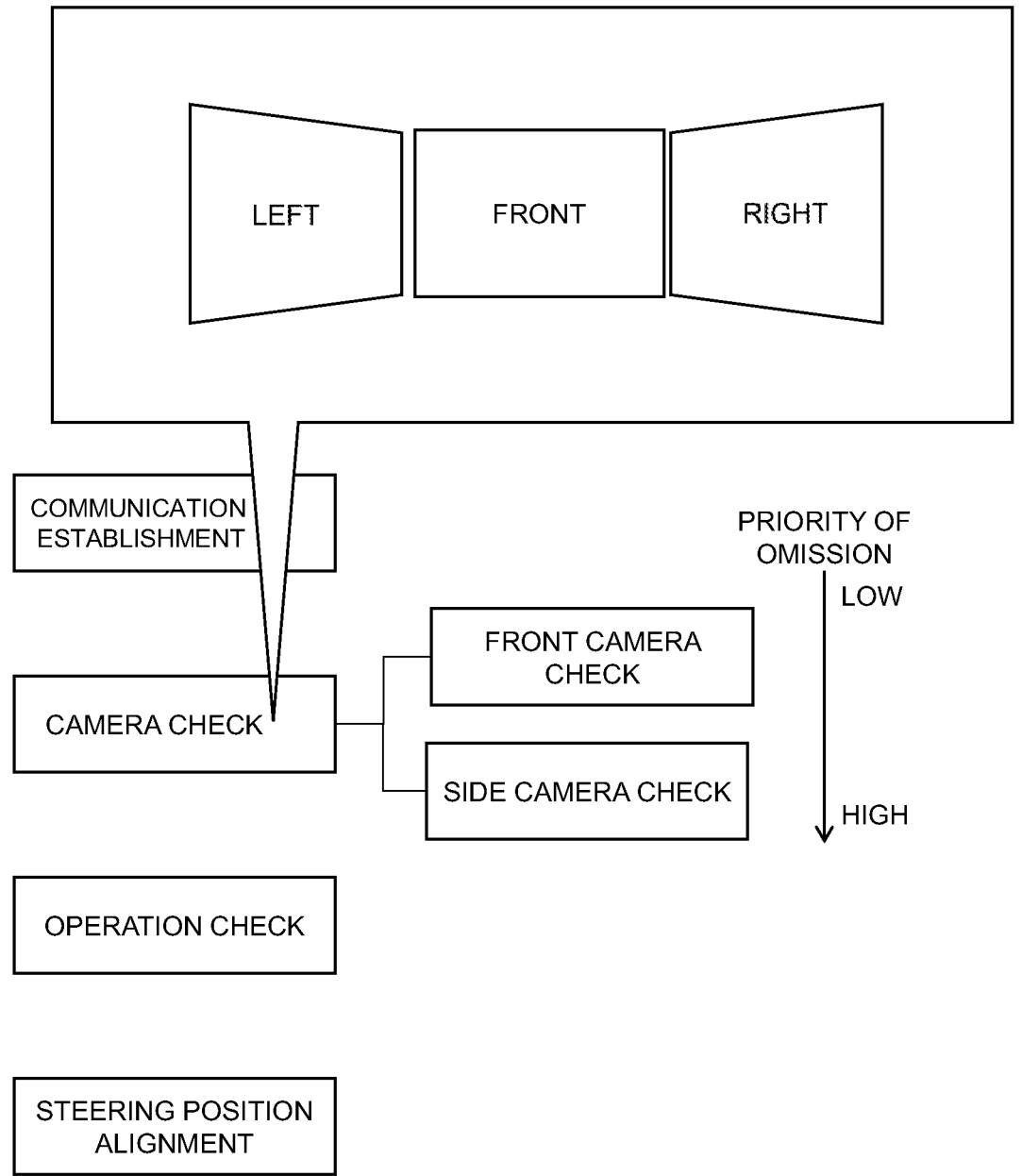
FIG. 12 is a diagram for explaining the first modification.

FIG. 12 is a diagram for explaining the first modification. In the first modification, the in-vehicle camera includes a front camera capturing a forward image as seen from the vehicle 100 and a side camera capturing a lateral image as seen from the vehicle 100. The initial check includes a camera check. The camera check is for checking that the in-vehicle camera operates normally. In other words, the camera check is checking that the image captured by the in-vehicle camera is normally acquired. The camera check further includes a front camera check for the front camera and a side camera check for the side camera.

The priority of omission of the side camera check is set to be higher than the priority of omission of the front camera check. It is considered that the remote operator X acquires more information from the image captured by the front camera than from that by the side camera during the remote driving. Therefore, the priority of omission of the side camera check is set to be higher. Similarly, in a case where the in-vehicle cameras include a camera other than the side camera, the priority of omission of the camera check for the camera other than the front camera is set to be higher than the priority of omission of the front camera check.

As a specific example of an applied scene, a case where the vehicle 100 is urgently stopped in the railroad crossing is considered. Since the urgency level of the first situation is high, the camera check for the camera other than the front camera is omitted, and in the initial check, it is checked that at least the front camera is normally operating. The remote operator X can start the vehicle 100 traveling by the remote driving referring to at least the image captured by the front camera and can make the vehicle 100 exit from the railroad crossing early.

7-2. Second Modification

Figure 13:
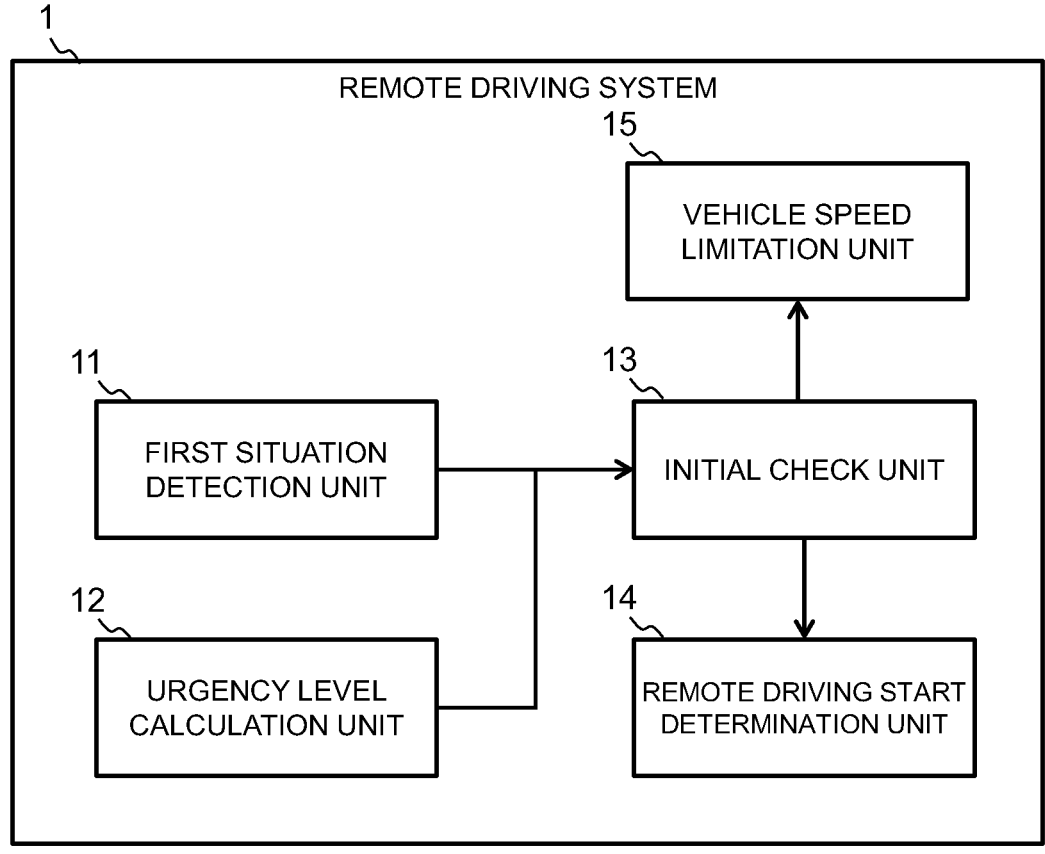
FIG. 13 is a block diagram illustrating an example of a functional configuration of the remote driving system according to the second modification.

FIG. 13 is a block diagram illustrating an example of a functional configuration of the remote driving system 1 according to the second modification. In the second modification, the remote driving system 1 includes a vehicle speed limitation unit 15 as a functional block.

The vehicle speed limitation unit 15 acquires information about whether the initial check is omitted or not from the initial check unit 13. When a part of the initial check is omitted, the vehicle speed limitation unit 15 sets an upper limit to a vehicle speed of the vehicle 100. The upper limit of the vehicle speed set here may be determined unconditionally or may be set in accordance with where the vehicle 100 is located. For example, the vehicle speed may be set to be a predetermined amount lower than a speed limit of the road on which the vehicle 100 is.

The vehicle speed limitation unit 15 may be included in the vehicle 100. In this case, the control device 150 controls the vehicle 100 such that the vehicle speed does not exceed the upper limit. Alternatively, the vehicle speed limitation unit 15 may be included in the remote driving terminal 200. In this case, the vehicle speed limitation unit 15 limits the input of the remote operator X such that the vehicle speed does not exceed the upper limit. Alternatively, the vehicle speed limitation unit 15 may be included in the management device 300. In this case, information about the vehicle speed set by the management device is transmitted to the vehicle 100 or the remote driving terminal 200.

In this modification, since the vehicle speed is limited, it is possible to improve safety of the traveling of the vehicle 100 even when a part of the initial check is omitted.

What is claimed is:

1. A remote driving system that performs remote driving of a vehicle based on an operation amount input into a remote driving terminal, the remote driving system comprising:

at least one processor; and at least one memory including computer program, where the at least one memory and the computer program are configured, with the at least one processor, to cause the remote driving system to at least:

detect a first situation in which the remote driving of the vehicle is required;

acquire an urgency level of the first situation;

perform an initial check for checking that the remote driving can be started at the remote driving terminal when the first situation is detected;

omit a part of the initial check according to the urgency level;

after the initial check is completed, transmit remote driving information indicating the operation amount input by a remote operator from the remote driving terminal to the vehicle; and control the vehicle to travel in accordance with the operation amount.

2. The remote driving system according to claim 1, wherein the at least one memory and the computer program are further configured to cause the remote driving system to increase an omission amount of the initial check as the urgency level increases.

3. The remote driving system according to claim 2, wherein the first situation is a situation in which a deviation amount of the vehicle from a target path exceeds a threshold value, and the urgency level is higher when the deviation amount is a second amount than when the deviation amount is a first amount smaller than the second amount.

4. The remote driving system according to claim 2, wherein the urgency level in a case where a stop position of the vehicle is in a dangerous area is higher than the urgency level in a case where the stop position is outside the dangerous area, and the dangerous area includes at least one of an area on a track of a streetcar, an area in a railroad crossing, and a stopping prohibited area.

5. The remote driving system according to claim 1, wherein the initial check at the remote driving terminal includes at least checking communication establishment with the vehicle and steering position alignment between the vehicle and the remote driving terminal, and the steering position alignment is omitted prior to the checking the communication establishment.

6. The remote driving system according to claim 1, wherein the initial check at the remote driving terminal includes at least checking communication establishment with the vehicle and an operation check for checking that an actuator of the vehicle operates in response to the operation amount transmitted to the vehicle, and the operation check is omitted prior to the checking the communication establishment.

7. The remote driving system according to claim 6, wherein the operation amount includes an operation amount of a steering and an operation amount of a brake, and the operation check for the steering is omitted prior to the operation check for the brake.

8. The remote driving system according to claim 1, wherein the initial check at the remote driving terminal includes at least checking communication establishment with the vehicle, position matching of steering of the vehicle and the remote driving terminal, and an operation check for checking that an actuator of the vehicle operates in response to the operation amount transmitted to the vehicle, and the position matching of the steering is omitted prior to checking the communication establishment and the operation check.

9. The remote driving system according to claim 1, wherein the initial check at the remote driving terminal includes at least a camera check for checking that an in-vehicle camera mounted on the vehicle operates normally, the in-vehicle camera includes a front camera capturing a forward image as seen from the vehicle and a side camera capturing a lateral image as seen from the vehicle, and the camera check for the side camera is omitted prior to the camera check for the front camera.

10. The remote driving system according to claim 1, wherein the at least one memory and the computer program are further configured to cause the remote driving system to set an upper limit for a vehicle speed of the vehicle when omitting a part of the initial check.

11. The remote driving system according to claim 1, wherein the at least one memory and the computer program are further configured to cause the remote driving system to:

acquire infrastructure information including an image captured by an infrastructure camera installed in an area where the vehicle travels; and

detect the first situation based on the infrastructure information.

12. A remote driving terminal that performs remote driving of a vehicle based on an operation amount input by a remote operator, the remote driving terminal comprising:

at least one processor; and at least one memory including computer program, where the at least one memory and the computer program are configured, with the at least one processor, to cause the remote driving terminal to at least:

acquire information indicating that a first situation in which the remote driving of the vehicle is required is detected;

acquire an urgency level of the first situation;

perform an initial check for checking that the remote driving terminal can start the remote driving when the first situation is detected;

omit a part of the initial check according to the urgency level;

after the initial check is completed, transmit remote driving information indicating the operation amount input by the remote operator from the remote driving terminal to the vehicle; and control the vehicle to travel in accordance with the operation amount.

13. A method for performing remote driving of a vehicle based on an operation amount input into a remote driving terminal, the method comprising:

detecting a first situation in which the remote driving of the vehicle is required;

acquiring an urgency level of the first situation;

performing an initial check for checking that the remote driving can be started at the remote driving terminal when the first situation is detected;

omitting a part of the initial check according to the urgency level;

after the initial check is completed, transmit remote driving information indicating the operation amount input by a remote operator from the remote driving terminal to the vehicle; and control the vehicle to travel in accordance with the operation amount.

* * * * *